(12) United States Patent
Yang

(10) Patent No.: US 8,052,226 B2
(45) Date of Patent: Nov. 8, 2011

(54) ELECTRONIC CONTROL BRAKE SYSTEM HAVING SIMULATION FUNCTION

(75) Inventor: I Jin Yang, Gyeonggi-do (KR)

(73) Assignee: Mando Corporation, Gyeonggi-Do (KR)

( * ) Notice: Subject to any disclaimer, the term of this patent is extended or adjusted under 35 U.S.C. 154(b) by 275 days.

(21) Appl. No.: 12/366,405

(22) Filed: Feb. 5, 2009

(65) Prior Publication Data
US 2009/0212622 A1 Aug. 27, 2009

(30) Foreign Application Priority Data
Feb. 21, 2008 (KR) .................. 10-2008-0015665

(51) Int. Cl.
*B60T 13/18* (2006.01)
(52) U.S. Cl. .............. 303/11; 303/113.4; 303/155
(58) Field of Classification Search ............ 303/11, 303/113.4, 119.2, 119.3, 155
See application file for complete search history.

(56) References Cited

U.S. PATENT DOCUMENTS

| | | | | |
|---|---|---|---|---|
| 5,709,438 A | * | 1/1998 | Isakson et al. | 303/113.4 |
| 6,213,572 B1 | | 4/2001 | Linkner, Jr. et al. | 303/155 |
| 6,345,871 B1 | * | 2/2002 | Harris et al. | 303/155 |
| 2007/0252428 A1 | * | 11/2007 | Okano et al. | 303/113.1 |
| 2010/0295365 A1 | * | 11/2010 | Nimura | 303/15 |

* cited by examiner

*Primary Examiner* — Pamela Rodriguez
(74) *Attorney, Agent, or Firm* — McDermott Will & Emery LLP

(57) ABSTRACT

Disclosed is an electronic control brake system capable of ensuing pedal force upon regenerative braking or brake-by-wire control. The electronic control brake system having a simulation function includes a master cylinder for forming oil pressure corresponding to displacement of a brake pedal, an oil tank for providing oil to the master cylinder, a cut-off valve installed on a hydraulic supply pipe that connects an inlet of the master cylinder with an inlet valve of a hydraulic brake, an oil return pipe for connecting an outlet valve of the hydraulic brake with an inlet of the oil tank, and a simulation valve installed on a differential adjusting pipe, which connects the hydraulic supply pipe with the oil return pipe, to generate pedal force.

5 Claims, 4 Drawing Sheets

PRIOR ART

ELECTRONIC CONTROL BRAKE SYSTEM HAVING SIMULATION FUNCTION

CROSS-REFERENCE TO RELATED APPLICATIONS

This application claims the benefit of Korean Patent Application No. 10-2008-0015665, filed on Feb. 21, 2008, in the Korean Intellectual Property Office, the disclosure of which is incorporated herein by reference.

BACKGROUND OF THE INVENTION

1. Field of the Invention

The present invention relates to an electronic control brake system. More particularly, the present invention relates to an electronic control brake system capable of ensuing pedal force upon regenerative braking or brake-by-wire control.

2. Description of the Prior Art

In general, as illustrated in FIGS. 1 and 2, an electronic control brake system 1 having a simulation function comprises a brake pedal 30 operated by a driver, a master cylinder 10, a hydraulic adjusting unit 40, an electronic control unit 80, a brake pedal displacement sensor 31 and a simulation chamber 33. The master cylinder 10 amplifies force transferred from the brake pedal 30 to generate brake fluid pressure. The hydraulic adjusting unit 40 is provided with a plurality of inlet valves 46 and a plurality of outlet valves 45 to supply hydraulic brakes 50 with the fluid pressure. The electronic control unit 80 controls the hydraulic adjusting unit 40. The brake pedal displacement sensor 31 is provided at one side of the brake pedal 30 to detect displacement of the brake pedal 30 and provides the detected displacement to the electronic control unit 80. The simulation chamber 33 is provided at one side of the master cylinder 10 to simulate stepping force of the brake pedal 30.

An oil tank 20 is provided at one side of the master cylinder 10 to provide oil to the master cylinder 10 and a hydraulic pump 41 of the hydraulic adjusting unit 40.

The hydraulic adjusting unit 40 is provided with the inlet valves 46, which are controlled by the electronic control unit 80 to adjust supply of oil to the hydraulic brakes 50, and the outlet valves 45 that are controlled by the electronic control unit 80 to adjust oil exhausted from the hydraulic brakes 50.

If the electronic control brake system 1 having the simulation function performs a normal mode, a hydraulic pump motor 42 and the hydraulic pump 41 are driven, so that oil is filled in an accumulator 43 at desired pressure. At this time, if a driver steps on the brake pedal 30, the brake pedal displacement sensor 31 detects the displacement of the brake pedal 30 to provide the electronic control unit 80 with the detected displacement. Then, the electronic control unit 80 opens the inlet valves 46 in accordance with the displacement of the brake pedal 30. Thus, the high pressure of oil stored in the accumulator 43 is introduced into the hydraulic brakes 50, so that a braking operation can be performed.

However, when the electronic control brake system 1 having the simulation function performs regenerative braking or brake-by-wire control, pressure of the master cylinder 10 is not adjusted, so that pedal force may not be ensured.

Further, braking performance of a vehicle may be degraded, causing traffic accidents.

SUMMARY OF THE INVENTION

Accordingly, it is an aspect of the present invention to provide an electronic control brake system having a simulation function, which can ensure pedal force upon regenerative braking or brake-by-wire control.

Additional aspects and/or advantages of the invention will be set forth in part in the description which follows and, in part, will be apparent from the description, or may be learned by practice of the invention.

The foregoing and/or other aspects of the present invention are achieved by providing an electronic control brake system having a simulation function including a master cylinder for forming oil pressure corresponding to displacement of a brake pedal, an oil tank for providing oil to the master cylinder, a cut-off valve installed on a hydraulic supply pipe that connects an inlet of the master cylinder with an inlet valve of a hydraulic brake, an oil return pipe for connecting an outlet valve of the hydraulic brake with an inlet of the oil tank, and a simulation valve installed on a differential adjusting pipe, which connects the hydraulic supply pipe with the oil return pipe, to generate pedal force.

In the electronic control brake system, an opening angle of the simulation valve is adjusted by controlling current applied to the simulation valve.

The simulation valve is a normal close valve.

The cut-off valve is closed when regenerative braking or brake-by-wire control is performed.

According to the electronic control brake system having the simulation function of the present invention as described above, pedal force can be ensured when regenerative braking or brake-by-wire control is performed.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Hereinafter, an embodiment of the present invention will be described in detail with reference to accompanying drawings.

Figure 1:
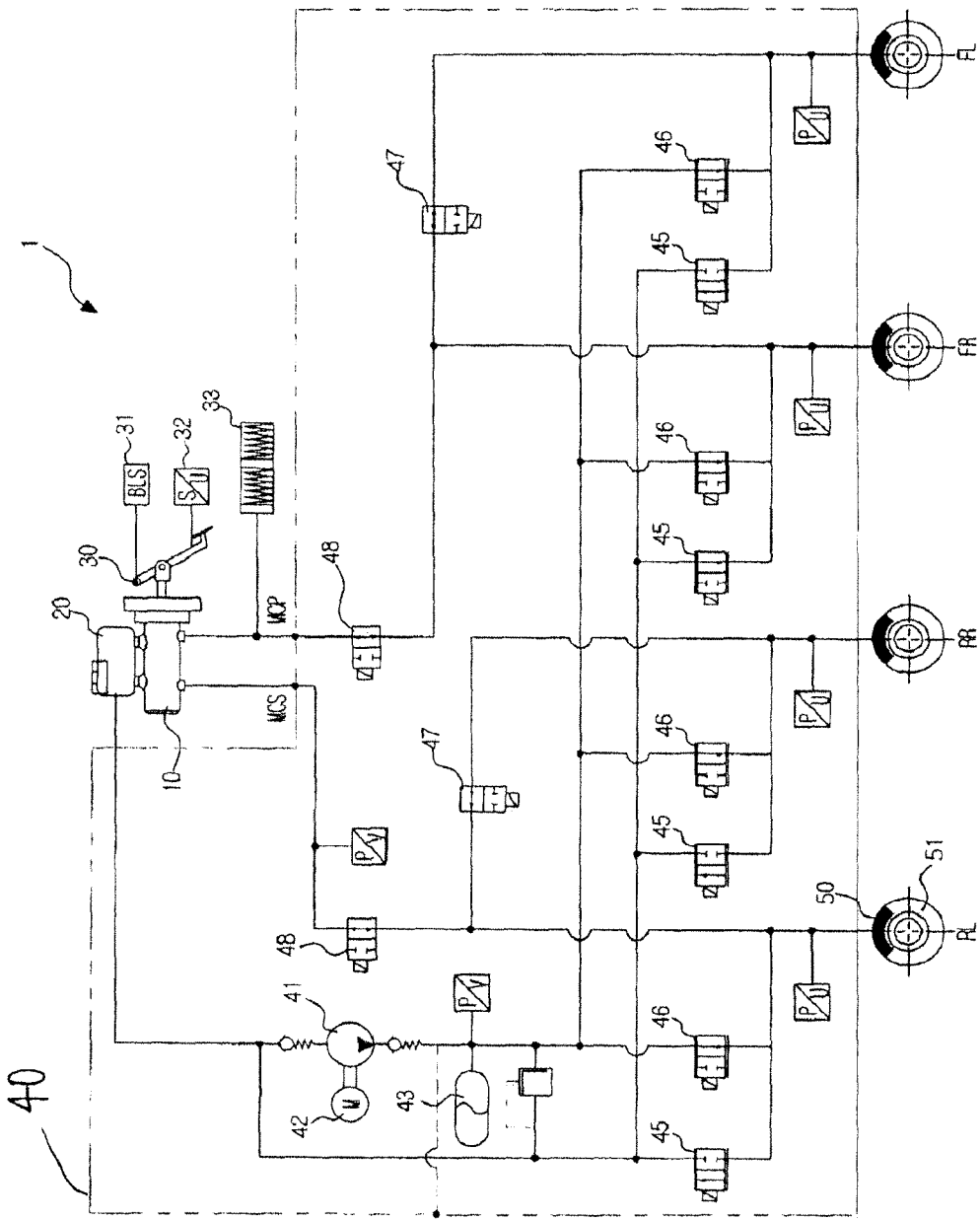
FIG. 1 is a circuit diagram schematically illustrating a conventional electronic control brake system having a simulation function.
Figure 2:
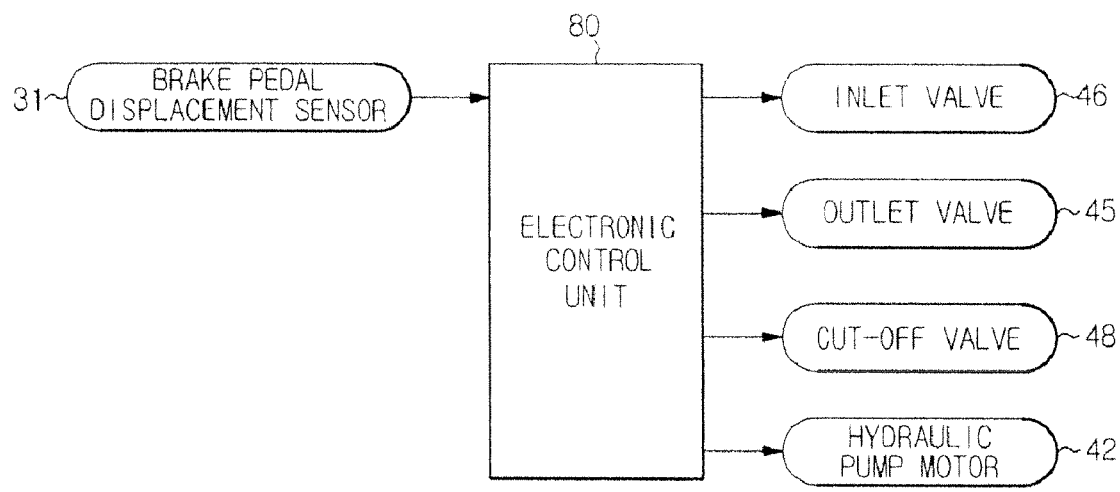
FIG. 2 is a block diagram schematically illustrating a control system of a conventional electronic control brake system having a simulation function.
Figure 3:
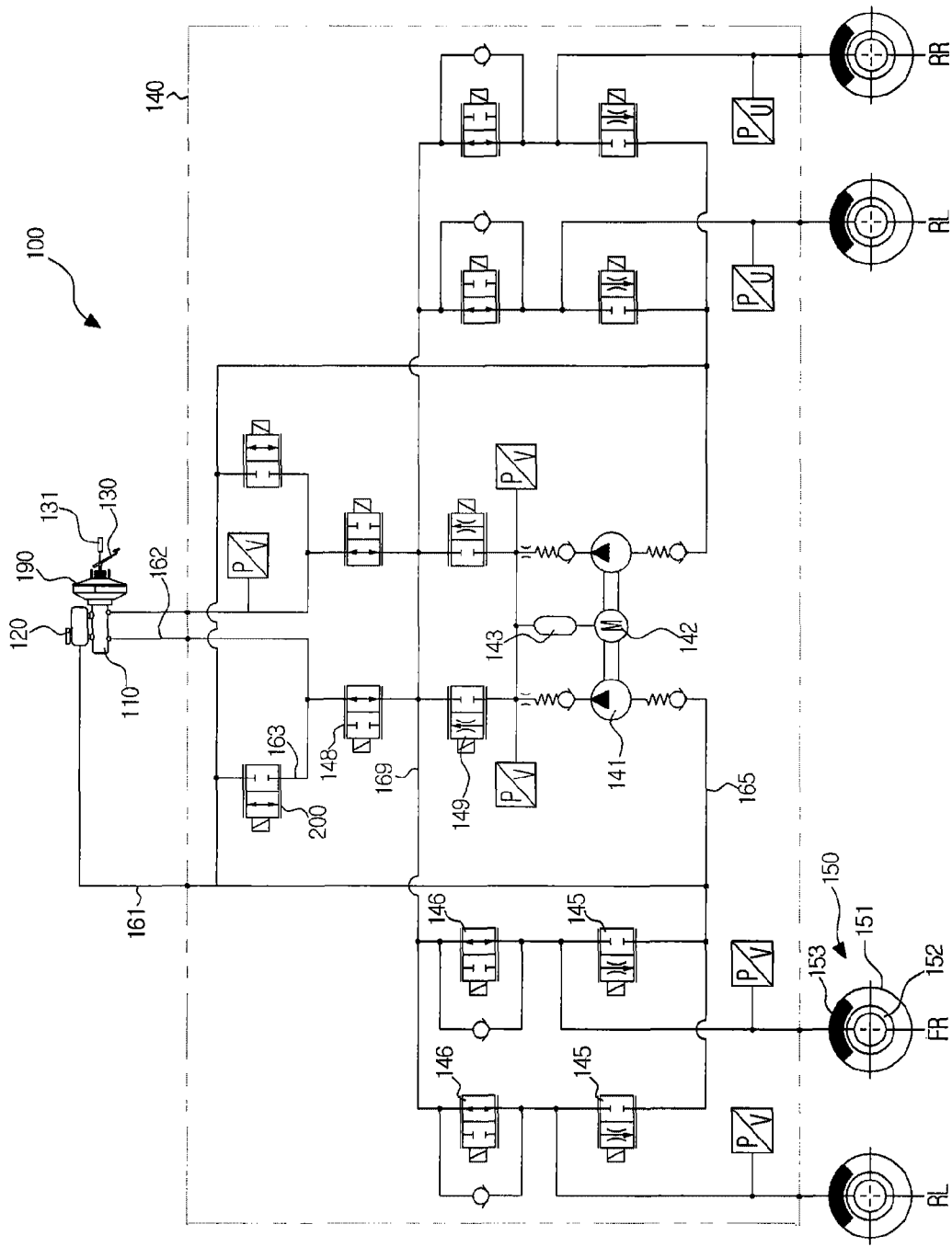
FIG. 3 is a circuit diagram schematically illustrating an electronic control brake system having a simulation function according to the present invention.
Figure 4:
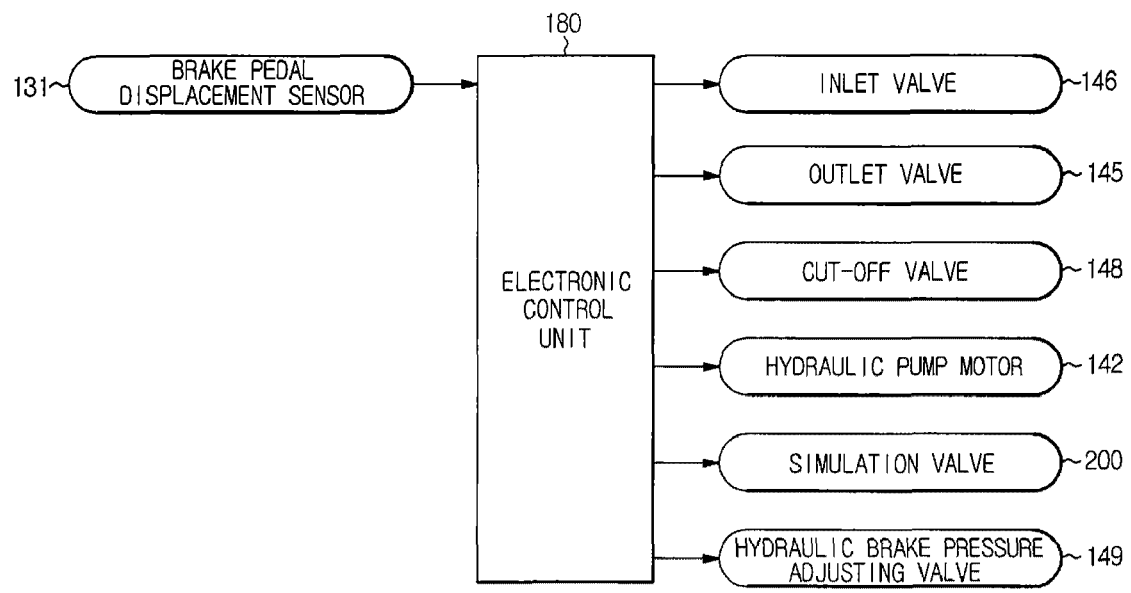
FIG. 4 is a block diagram schematically illustrating a control system of an electronic control brake system having a simulation function according to the present invention.

Referring to FIGS. 3 and 4, an electronic control brake system 100 having a simulation function according to the present invention comprises a hydraulic brake 150 for stopping vehicle wheels, a master cylinder 110, a hydraulic adjusting unit 140 and an electronic control unit 180. The master cylinder 110 generates hydraulic brake pressure when a driver steps on a brake pedal 130. The hydraulic adjusting unit 140 transfers the hydraulic brake pressure to the hydraulic brake 150 or is controlled by the electronic control unit 180 to provide the hydraulic brake 150 with the braking oil pressure. The electronic control unit 180 controls the electronic control brake system 100 having the simulation function.

The hydraulic brake 150 comprises a brake disc 151 connected with a shift 152 of vehicle wheels and a housing 153 to control the brake disc 151. A brake cylinder (not shown) is installed in the housing 153 and a hydraulic piston (not shown) reciprocates in the brake cylinder to press the brake disc 151. As oil pressure is supplied to the hydraulic brake 150 from the hydraulic adjusting unit 140, the hydraulic piston presses the brake disc 151, so that the hydraulic brake 150 stops a vehicle.

A booster 190 is installed at one side of the master cylinder 110 to provide force to the master cylinder 110. In detail, the booster 190 amplifies force transferred from the brake pedal 130 to provide the amplified force to the master cylinder 110.

Meanwhile, a brake pedal displacement sensor 131 is installed at one side of the brake pedal 130 to detect displacement of the brake pedal 130, and provides the detected displacement to the electronic control unit 180.

An oil tank 120 is installed at the other side of the master cylinder 110. An outlet of the oil tank 120 is connected with the master cylinder 110 to supply the master cylinder 110 with oil, so that oil is always filled in the master cylinder 110. An inlet of the oil tank 120 is connected with an outlet of an outlet valve 145, which is disposed at a downstream side of the hydraulic brake 150, through a first oil return pipe 161.

An outlet of the master cylinder 110 is connected with a cut-off valve 148 of the hydraulic adjusting unit 140 and a differential pressure adjusting pipe 163, which is connected with the first oil return pipe 161, through a first hydraulic supply pipe 162. An inlet of the master cylinder 110 is connected with an outlet of the first oil return pipe 161.

The hydraulic adjusting unit 140 comprises an inlet valve 146 that serves as a normal open valve provided at an upstream side of the hydraulic brake_150, the outlet valve 147 that serves as a normal close valve provided at a downsteam side of the hydraulic brake 150, a hydraulic pump 141 connected with the outlet of the outlet valve 145 to generate hydraulic brake pressure, a hydraulic brake pressure adjusting valve 149 provided at an output side of the hydraulic pump 141 to adjust hydraulic brake pressure provided to the inlet valve 146, an accumulator 143, and a hydraulic pump motor 142 that rotates the hydraulic pump 141. The accumulator 143 is disposed between the hydraulic brake pressure adjusting valve 149 and the output side of the hydraulic pump 141 to allow the hydraulic brake pressure generated from the hydraulic pump 141 to be uniformly transferred to the hydraulic brake pressure adjusting valve 149.

An outlet of the hydraulic brake pressure adjusting valve 149 is connected with an inlet of the inlet valve 146 through a second hydraulic supply pipe 169. Further, an outlet of a second oil return pipe 165 branching from the first oil return pipe 161 is connected with an inlet of the hydraulic pump 141, so that the inlet of the hydraulic pump 141 is connected with the outlet of the outlet valve 145. Further, an outlet of the first hydraulic supply pipe 162 is connected with one side of the second hydraulic supply pipe 169, and an outlet of the second hydraulic supply pipe 169 is connected with the inlet of the inlet valve 146. An intermediate part of the first hydraulic supply pipe 162 is connected with an intermediate part of the first oil return pipe 161 through the differential pressure adjusting pipe 163.

A simulation valve 200 serving as a normal close valve is installed on the differential pressure adjusting pipe 163, and the cut-off valve 148 serving as a normal open valve is installed on the outlet of the first hydraulic supply pipe 162.

The brake pedal displacement sensor 131 is provided at an input side of the electronic control unit 180. Further, the inlet valve 146, the outlet valve 145, the cut-off valve 148, the hydraulic pump motor 142, the hydraulic brake pressure adjusting valve 149 and the simulation valve 200 are provided at an output side of the electronic control unit 180.

When regenerative braking or brake-by-wire control is performed, the electronic control unit 180 controls an opening angle of the hydraulic brake pressure adjusting valve 149 according to the displacement of the brake pedal 130, which is detected by the brake pedal displacement sensor 131, thereby adjusting brake fluid pressure applied to the hydraulic brake 150. Further, the electronic control unit 180 closes the cut-off valve 148 and controls an opening angle of the simulation valve 200 to adjust differential pressure between the master cylinder 110 and the oil tank 120, thereby ensuring stepping force of the brake pedal 130.

Hereinafter, an operation of the electronic control brake system 100 having the simulation function according to the present invention will be described.

First, if the electronic control brake system 100 having the simulation function performs a normal operation, i.e., regenerative braking or brake-by-wire control, the hydraulic pump motor 142 is driven to pump oil discharged from the outlet of the outlet valve 145, so that the oil is stored in the accumulator 143 at reference pressure. At this time, if a driver steps on the brake pedal 130, the brake pedal displacement sensor 131 detects brake displacement to provide the electronic control unit 180 with the brake displacement. Then, the electronic control unit 180 controls the hydraulic brake pressure adjusting valve 149, the inlet valve 146 and the outlet valve 145 according to the brake displacement to adjust pressure in the brake cylinder provided in the housing 153. Thus, the brake disc 151 is operated to stop a vehicle being run.

Further, when the electronic control brake system 100 having the simulation function performs the normal operation, i.e., the regenerative braking or the brake-by-wire control, the electronic control unit 180 closes the cut-off valve 148 to prevent pressure, which is generated from the master cylinder 110, from being transferred to the inlet valve 146. Further, the electronic control unit 180 continuously adjusts current applied to the simulation valve 200 to control an opening angle of the simulation valve 200, thereby controlling differential pressure between the oil tank 120 and the master cylinder 110. Thus, stepping force of the brake pedal 130 can be continuously formed.

Furthermore, when the electronic control brake system 100 having the simulation function is in a backup mode, that is, the electronic control brake system 100 is broken down, the cut-off valve 148 is open and the simulation valve 200 is closed. Thus, the hydraulic brake pressure of the master cylinder 110, which is formed when a driver steps on the brake pedal 130, is directly transferred to the brake cylinder, so that the brake disc 151 is operated to stop the vehicle while running.

What is claimed is:
1. An electronic control brake system having a simulation function, the electronic control brake system comprising:
   a master cylinder that forms oil pressure corresponding to displacement of a brake pedal;
   an oil tank that provides oil to the master cylinder;
   a cut-off valve installed on a hydraulic supply pipe that connects an inlet of the master cylinder with an inlet valve of a hydraulic brake;
   an oil return pipe that connects an outlet valve of the hydraulic brake with an inlet of the oil tank;
   a simulation valve installed on a differential adjusting pipe, which connects the hydraulic supply pipe with the oil return pipe, to generate pedal force; and a hydraulic brake pressure adjusting valve located at an output side of a hydraulic pump configured to adjust hydraulic brake pressures of the inlet valve and the hydraulic pump.

2. The electronic control brake system of claim 1, wherein an opening angle of the simulation valve is adjusted by controlling current applied to the simulation valve.

3. The electronic control brake system of claim 1, wherein the simulation valve comprises a normal close valve.

4. The electronic control brake system of claim 1, wherein the cut-off valve is closed when regenerative braking or brake-by-wire control is performed.

5. The electronic control brake system of claim 1, wherein the cut-off valve is open in a backup mode.

* * * * *